Aug. 18, 1964  C. J. DEMRICK  3,145,060
WHEEL COVER
Filed Aug. 28, 1962  2 Sheets-Sheet 1
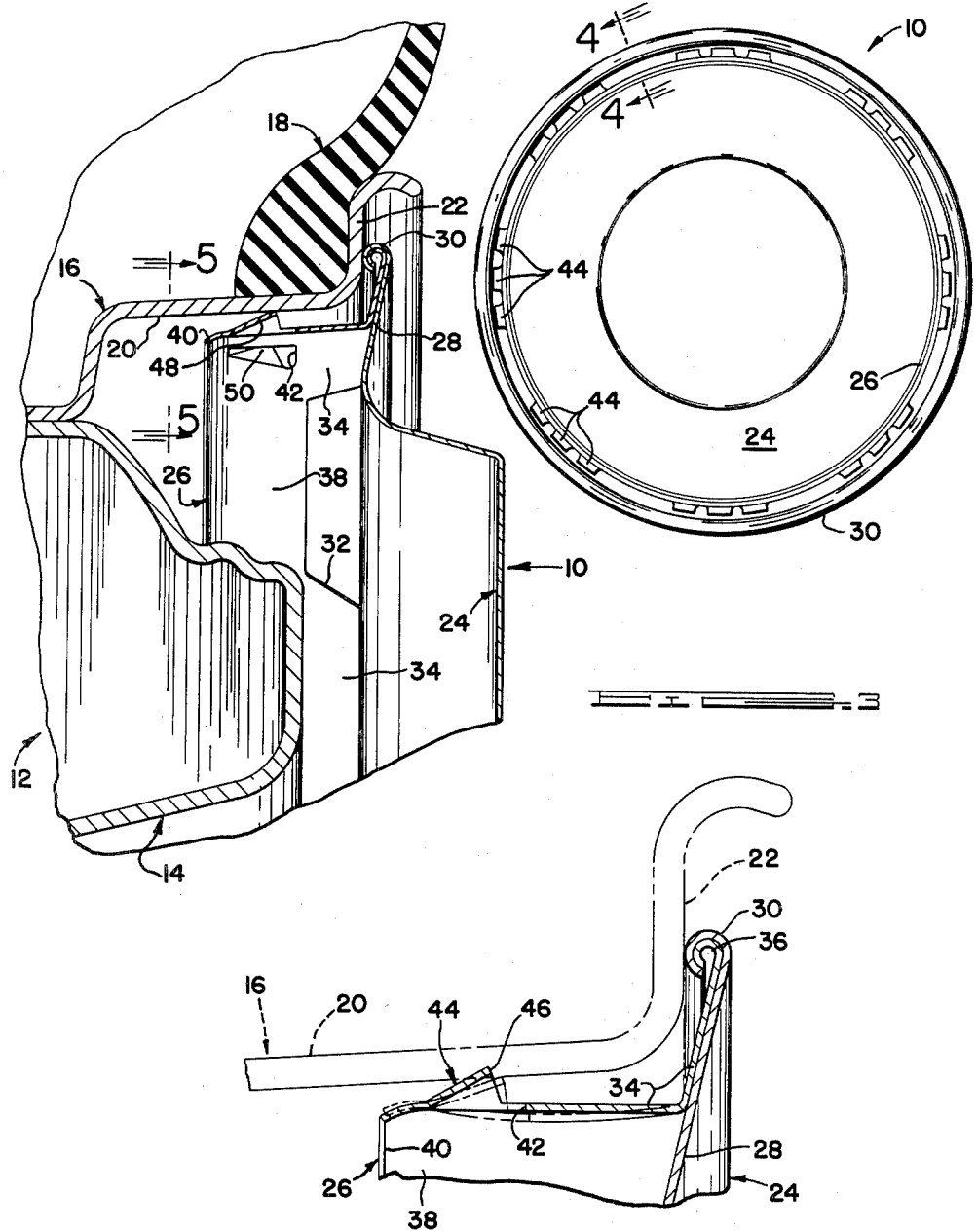
INVENTOR.
CARL J. DEMRICK
BY
OLSEN AND STEPHENSON
ATTORNEYS Aug. 18, 1964
C. J. DEMRICK
WHEEL COVER
3,145,060
Filed Aug. 28, 1962
2 Sheets-Sheet 2
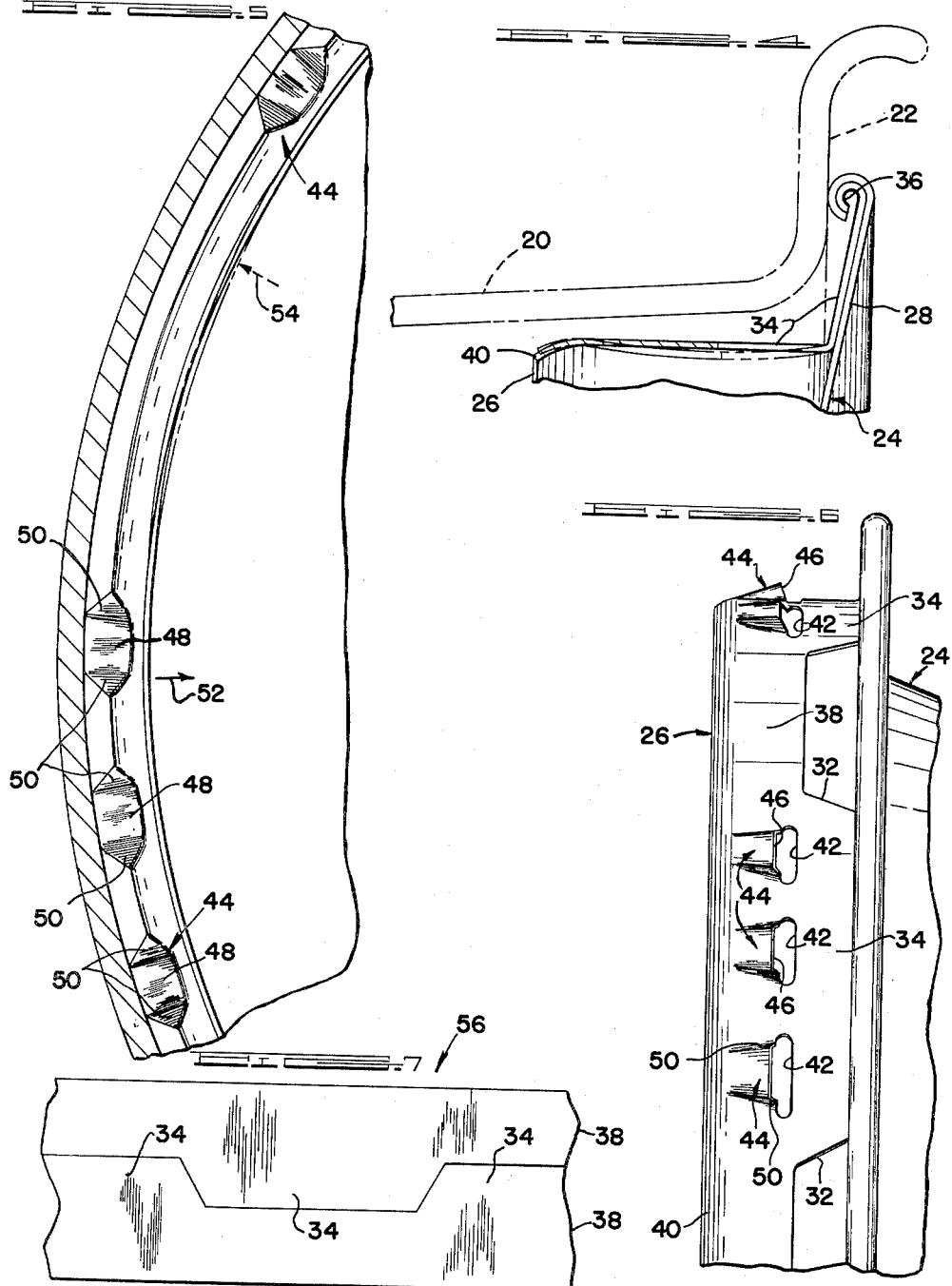
INVENTOR.
CARL J. DEMRICK
BY
OLSEN AND STEPHENSON
ATTORNEYS

United States Patent Office 3,145,060
Patented Aug. 18, 1964

3,145,060
WHEEL COVER
Carl J. Demrick, Birmingham, Mich., assignor to Avis Industrial Corporation, Almont, Mich., a corporation of Delaware
Filed Aug. 28, 1962, Ser. No. 220,020
9 Claims. (Cl. 301—37)

The present invention relates to improvements in wheel covers such as are adapted to be applied to the outer sides of vehicle wheels, and more particularly concerns improvements in the means for retention of such covers on the wheels.

It is an object of the present invention to provide an improved wheel cover for the outer side of a wheel structure which cover can be easily and conveniently applied to the wheel structure and can conveniently be pried free from the wheel structure without damage to either part and so that both parts can be continuously used for an extended period of time.

It is another object of the present invention to provide a cover of the foregoing character which is constructed and arranged so that it can accommodate wheel structures having a normally wide range of tolerances in the dimensions of the flanges on which the cover is adapted to be mounted and which will continue to provide optimum retention characteristics under these conditions.

It is still another object of the present invention to provide a cover of the foregoing character which is constructed and arranged so that it can be manufactured by use of a minimum of material and at relatively low manufacturing costs.

It is still another object of the present invention to provide a cover of the foregoing character which has circumferentially arranged retention elements for gripping engagement with an axial flange of the wheel structure and which has such retention elements positioned in a continuous circular band so as to assure maximum and uniform radially outward thrust of the retention elements against the axial flange.

Other objects of this invention will appear in the following description and appended claims, reference being had to the accompanying drawings forming a part of this specification wherein like reference characters designate corresponding parts in the several views.

In the drawings:

FIGURE 1 is a rear elevational view of a wheel cover embodying the features of the present invention;

FIGURE 2 is an enlarged fragmentary radial sectional view through a wheel showing the cover applied to the outer side of the wheel;

FIGURE 3 is a fragmentary radial sectional view similar to FIGURE 2 but on a larger scale showing the cover in solid lines in its free state and showing the rim and cover in broken lines as it is mounted on the rim;

FIGURE 4 is a fragmentary radial sectional view similar to FIGURE 3 but taken on the line 4—4 of FIGURE 1;

FIGURE 5 is an enlarged fragmentary rear elevation taken on the lines 5—5 of FIGURE 2;

FIGURE 6 is a fragmentary end elevational view of the cover; and

FIGURE 7 is a fragmentary top plan view of a strip of material as it may be cut to form the band in the cover of FIGURES 1 to 6.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. A wheel cover 10, according to the present invention, is constructed and arranged to be applied to the outer side of a vehicle wheel 12, including a wheel body 14, a tire rim 16 and a pneumatic tire 18. The tire rim 16 is of a conventional type and includes an intermediate axial flange 20 and a side or radial flange 22 which extends radially outwardly from the axial flange 20.

The cover 10 is preferably manufactured from two sheet metal parts, one being the circular member or disk 24, which has an ornamental outer side and which conceals the wheel body 14 and portions of tire rim 16, and the other being the annular member 26 which has retention means for holding the cover 10 on the wheel 12. The circular member 24 has an outer peripheral portion 28 which terminates in a peripheral edge 30, which edge normally is seated on the side flange 22 of the tire rim 16 and to which the annular member 26 is suitably connected, as by the rolled or turned over edge shown in the drawings.

The annular member 26 is formed from a flat strip of sheet metal which is notched along one edge, as shown at 32, to provide a plurality of axially outwardly extending leg portions 34. The latter extend axially outwardly into engagement with the inner surface of the circular member 28 and then extend generally radially outwardly in back-up relation to the circular member 28 and have their terminal ends 36 secured at the peripheral edge 30 to the peripheral portion 28.

The axially inner portion of the annular member 26 is essentially a generally continuous cylindrical band 38 from which the leg portions 34 extend. The axially innermost edge 40 of the band 38 converges inwardly to define, in cross section, an inclined inner portion, for a purpose to be described. Circumferentially aligned around the circumference of the band 38 are a plurality of slots 42 which in the illustrated embodiment are arranged in groups of three, each such group being generally within the confines of longitudinal extensions of the leg portions 34. Pressed radially outwardly from the material of the band 38, immediately inwardly from each of slots 42, are retention elements 44 which are inclined axially and radially outwardly and have as their terminal edges the edges 46 of the slots 42. The retention elements 44 have a generally flat, inclined surface 48, FIGURE 5, which is generally an extension of the inclined innermost edge 40, and side portions 50 which integrally join the inclined surfaces 48 with the main body of band 38, thus assuring that the retention elements 44 will be relatively stiff and will function as an integral part of the band 38.

In its free and unstressed state, prior to pressing the cover 10 on the rim 16, the diameter of a circle containing the aligned relatively straight edges 46 will be larger than the corresponding diameter of that portion of the axial flange 20 with which the edges 46 are intended to be in a retaining engagement. This can be seen in FIGURE 3 wherein the cover 10 is shown in solid lines in its free and unstressed state and the rim 16 is shown in broken lines. When the cover 10 is pressed onto the rim 16, the band 38 and its integral parts will be deformed to the positions shown in broken lines in FIGURES 3, 4 and 5.

As shown in FIGURES 3, 4 and 5, when the cover 10 is pressed on the rim 16, the wedging action of the retention elements 44 will cause the band 38 to twist in a clockwise direction, as viewed in the cross-section of FIGURES 3 and 4. This will have the effect of bowing the axial extensions of the leg portions 34 radially inwardly and will also tend to straighten the inwardly extending innermost edge 40 into a cylindrical shape. When stressed in this manner, the leg portions 34 and the inclined inner portion 40 will apply resilient pressure urging the retention elements 44 radially outwardly to their normal unstressed positions shown in solid lines in FIGURE 3. Thus, the gripping edges 46 will be constantly urged into gripping engagement with the axial flange 20 and will thus accommodate any tolerances or irregularities in the dimensions of the rim 16.

The retention elements 4 are located in the continuous band 38 and this structural feature will assure further outward thrusting action by the retention elements 44, because the continuous band 38 will be constantly in a state of compression by virtue of the wedging action that takes place on the retention elements 44 when pressing the cover 10 on the rim 16. When this last operation is performed, the band 38 will be pressed out of its normally round shape as shown by the solid lines in FIGURE 5. As seen in this figure, the circumferential segments of band 38 in which the set of three retention elements 44 are located is urged radially inwardly as indicated by directional arrow 52, and to compensate for this inward deflection, the segment between the sets of three retention elements is urged radially outwardly, as indicated by the directional arrow 54. Thus, by virtue of the spring properties of the material of the band 38, further retention of the cover 10 is assured by the band 38 exerting resilient pressure against the retention elements 44 and thereby, via their edges 46, against the axial flange 20. This functioning of the continuous band 38 is further enchanced by the inclined or beaded structure at the axially inner edge 40 which tends to rigidfy the band and resists distorting the band 38 when the cover 10 is applied to a wheel.

Normally, it is desired that the circumferential width of the leg portions 34 be approximately equal to the circumferential width or extent of the notches 32. This relationship is found to provide leg portions of sufficient rigidiy to provide desired resilient pressure against the retention elements 44 when such leg portions are stressed as indicated above during the operation of pressing the cover 10 on the rim 16. This dimensional relationship between the leg portions 34 and notches 32 serves another useful purpose. When manufacturing the cover 10, the band 38 can be made from a strip of sheet metal 56, FIGURE 7, and such a strip of less than twice the width of the band 38 can be used to produce two bands 38. As seen in FIGURE 7, each leg portion derives its material from the notched portion of the adjacent band 38. Thus, approximately a 50% savings in metal for the band 38 is realized when making a cover 10 embodying the novel features of the present invention.

Having thus described my invention, I claim:

1. In a wheel structure having rim and body parts which include a side flange and an axial flange radially and axially inward of the side flange, a cover for disposition at the outer side of the wheel structure comprising a circular member having an outer periphery seated on said side flange, an annular member extending axially inwardly within said axial flange, said annular member having a continuous axially inner edge that is essentially in one plane and a notched axially outer edge defining between the notches axially outwardly extending circumferentially spaced leg portions which engage intermediate their ends the axially inner surface of said circular member and then extend generally radially outwardly in engagement with said circular member and have their terminal ends secured to the outer periphery of said circular member, said annular member also having adjacent to said inner edge a plurality of retention elements extending radially and axially outwardly providing edges located in a common plane for retainingly engaging said axial flange.

2. In a wheel structure having rim and body parts which include a side flange and an axial flange located radially and axially inward of the side flange, a cover for disposition at the outer side of the wheel structure comprising a circular member having an outer periphery overlying at least a portion of the rim part of said wheel, an annular member extending axially inwardly within said axial flange, said annular member having a continuous axially inner edge that is essentially in one plane and a notched axially outer edge defining between the notches leg portions which extend axially outwardly for part of their lengths and then turn generally radially outwardly and are secured at their terminal ends to said circular member, at least one of said circular member and said annular member having a portion seated on said side flange, said annular member also having adjacent to said inner edge a plurality of retention elements extending radially and axially outwardly providing edges in a common plane for retainingly engaging said axial flange.

3. In a wheel structure having a side flange and an axial flange radially and axially inward thereof, a cover for disposition at the outer side of the wheel structure comprising a circular member having an outer peripheral portion overlying said side flange, and an annular member extending axially inwardly within said axial flange, said annular member having a continuous generally cylindrical band at its axially innermost end and a plurality of circumferentially spaced leg portions integral therewith and extending axially outwardly and having their terminal ends secured to the peripheral portion of said circular member, said band including a plurality of retention elements extending radially outwardly therefrom and having terminal edges for retainingly engaging said axial flange.

4. In a wheel structure having a side flange and an axial flange radially and axially inward thereof, a cover for disposition at the outer side of the wheel structure comprising a circular member having an outer peripheral portion terminating in a peripheral edge seated against said side flange, and a annular member extending axially inwardly within said axial flange, said annular member having a continuous generally cylindrical band at its innermost end and a plurality of circumferentially equally spaced leg portions extending axially outwardly from said band into engagement with circular member and then extending radially outwardly in back-up relation to said circular member and having their terminal ends secured to the peripheral edge of the circular member, said band including a plurality of retention elements extending radially outwardly therefrom and having terminal edges in a common plane for retainingly engaging said axial flange.

5. In a wheel structure having a side flange and an axial flange radially and axially inward thereof, a cover for disposition at the outer side of the wheel structure comprising a circular member having an outer peripheral portion overlying said side flange, and an annular member extending axially inwardly within said axial flange, said annular member having a continuous generally cylindrical band at its axially innermost end and a plurality of circumferentially spaced leg portions integral therewith and extending axially outwardly and having their terminal ends secured to the peripheral portion of said circular member, said band including a plurality of circumferentially aligned slots spaced around its circumference in groups located respectively within the confines of axial extensions of said leg portions, and a plurality of retention elements pressed radially outwardly adjacent to said slots and on the axially inner sides thereof so that a plurality of relatively stiff axially and radially outwardly facing edges are provided retainingly engaging said axial flange.

6. In a wheel structure having a side flange and an axial flange radially and axially inward thereof, a cover for disposition at the outer side of the wheel structure comprising a circular member having an outer peripheral portion terminating in a peripheral edge seated against said side flange, and an annular member extending axially inwardly within said axial flange, said annular member having a continuous generally cylindrical band at its innermost end and a plurality of circumferentially spaced leg portions extending axially outwardly therefrom into engagement with said circular member and then extending radially outwardly in backup relation to said circular member and having their terminal ends secured to the peripheral edge of the circular member, the circumferential extent of the space between said leg portions being relatively the same as the corresponding circumferential width of said leg portions, said band including a plurality of circumferentially aligned slots arranged in the band so as to be generally within the confines of axial extensions of said leg portions, and a plurality of retention elements pressed radially outwardly of the material forming the band adjacent to said slots on the axially innermost sides thereof so that a plurality of relatively stiff axially and radially outwardly facing edges are provided retainingly engaging said axial flange, said stiff edges being in a common plane.

7. In a wheel structure having a side flange and an axial flange radially and axially inward thereof, a cover for disposition at the outer side of the wheel structure comprising a circular member having an outer peripheral portion seated against said side flange, and an annular member connected to the peripheral portion of said circular member and having a plurality of circumferentially spaced resiliently yieldable leg portions extending axially inwardly therefrom and terminating in a continuous circular axial band, said band having a plurality of radially and axially outwardly inclined retention elements therein terminating in circumferentially extending stiff edges located in a common plane in gripping engagement with said axial flange, said stiff edges when thus pressed into gripping engagement, twisting said axial band so as to bow said leg portions radially inwardly.

8. In a wheel structure having a side flange and an axial flange radially and axially inward thereof, a cover for disposition at the outer side of of the wheel structure comprising a circular member having an outer peripheral portion seated against said side flange, and an annular member connected to said peripheral portion and having a plurality of circumferentially spaced resiliently yieldable leg portions extending axially inwardly therefrom and terminating in a continuous circular axial band, the axially inner portion of said band being inclined radially inwardly, said band having a plurality of radially and axially outwardly inclined retention elements therein terminating in circumferentially extending stiff edges pressed into gripping engagement with said axial flange, said stiff edges when pressed into gripping engagement, causing twisting of said axial band so as to bow said leg portions radially inwardly and tend to enlarge the inner diameter of the radially inwardly inclined inner portion of said band, said leg portions and said inclined inner portion when thus stressed applying resilient pressure urging said stiff edges against said axial flange.

9. In a wheel structure having a side flange and an axial flange radially and axially inward thereof, a cover for disposition at the outer side of the wheel structure comprising a circular member having an outer peripheral portion seated against said side flange, and an annular member connected to said peripheral portion and having a plurality of circumferentially spaced resiliently yieldable leg portions extending axially inwardly therefrom and terminating in a continuous circular axial band, said leg portions having a circumferential width substantially equal to the circumferential width between them, the axially inner portion of said axial band being inclined radially inwardly, said band having a plurality of radially and axially outwardly inclined retention elements terminating in stiff edges generally in circumferential alignment, said retention elements being formed from material of said band constituting longitudinal extensions of said leg portions, said retention elements when pressed into said axial flange causing limited twisting of said axial band so as to bow said leg portions and tend to enlarge the inner diameter of the radially inwardly inclined inner portion of said band, said leg portions and said inclined inner portion when thus stressed applying resilient pressure urging said stiff edges against said axial flange.

References Cited in the file of this patent
UNITED STATES PATENTS

| | | |
|---|---|---|
| 2,660,478 | Lyon | Nov. 24, 1953 |
| 2,669,487 | Horn | Feb. 16, 1954 |
| 2,939,743 | Lyon | June 7, 1960 |
| 3,037,817 | Spisak | June 5, 1962 |
| 3,071,416 | Leich | Jan. 1, 1963 |

FOREIGN PATENTS

| | | |
|---|---|---|
| 564,740 | Canada | Oct. 14, 1958 |